P. ECKENROTH.
VALVE.
APPLICATION FILED APR. 5, 1916.
1,232,421.
Patented July 3, 1917.
2 SHEETS—SHEET 2.
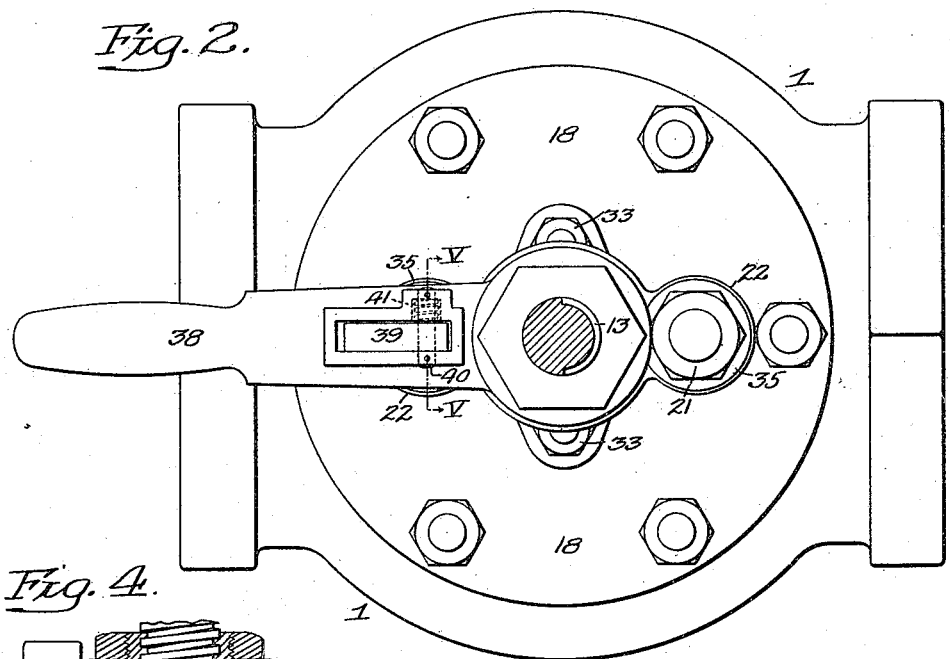
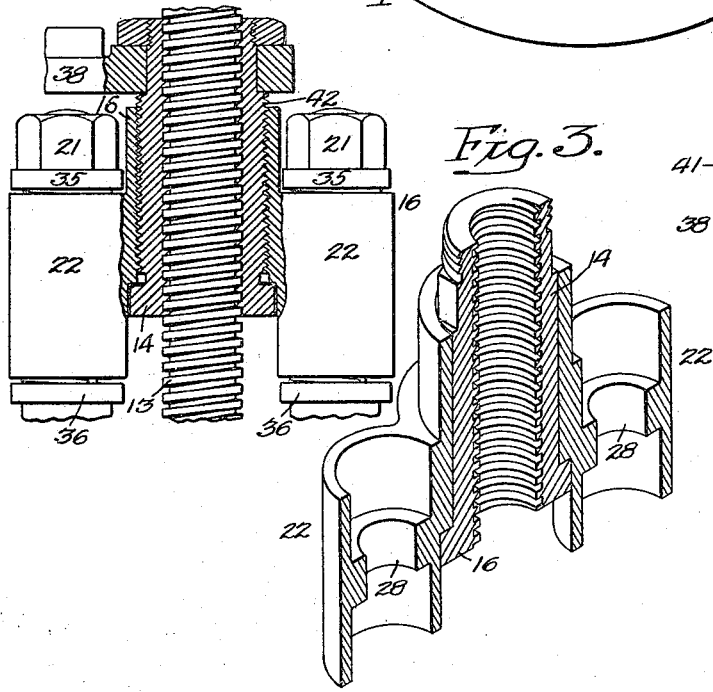
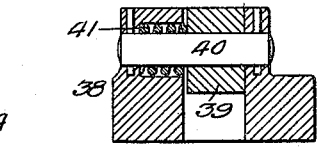
Inventor-
Philip Eckenroth
by his Attorneys-
Howson & Howson

UNITED STATES PATENT OFFICE.

PHILIP ECKENROTH, OF PHILADELPHIA, PENNSYLVANIA.

VALVE.

1,232,421. Specification of Letters Patent. Patented July 3, 1917.

Application filed April 5, 1916. Serial No. 89,131.

*To all whom it may concern:*

Be it known that I, PHILIP ECKENROTH, a citizen of the United States, residing in Philadelphia, Pennsylvania, have invented certain Improvements in Valves, of which the following is a specification.

My invention relates to valve structures and consists of certain improvements in the valve structure illustrated and described in my application for patent filed August 18, 1915, Serial No. 46,194; having substantially the same object in view, to wit: the provision of means for facilitating the seating of the valve disk whereby a fluid tight joint may be maintained. A further feature of my invention is the provision of improved means permitting the grinding of the disk valve to its seat, while a still further object is to provide means for grinding the disk valve to its seat, or a collar on the stem to a seat in the bonnet, while the structure is under full pressure of steam or any other fluid or liquid.

These and other features of my invention are more fully described hereinafter, reference being had to the accompanying drawings, in which:

Fig. 2, is a plan view, partly in section on the line II—II, Fig. 1;

Fig. 3, is a sectional perspective view of a detail of the structure shown in Fig. 1;

Figure 1:
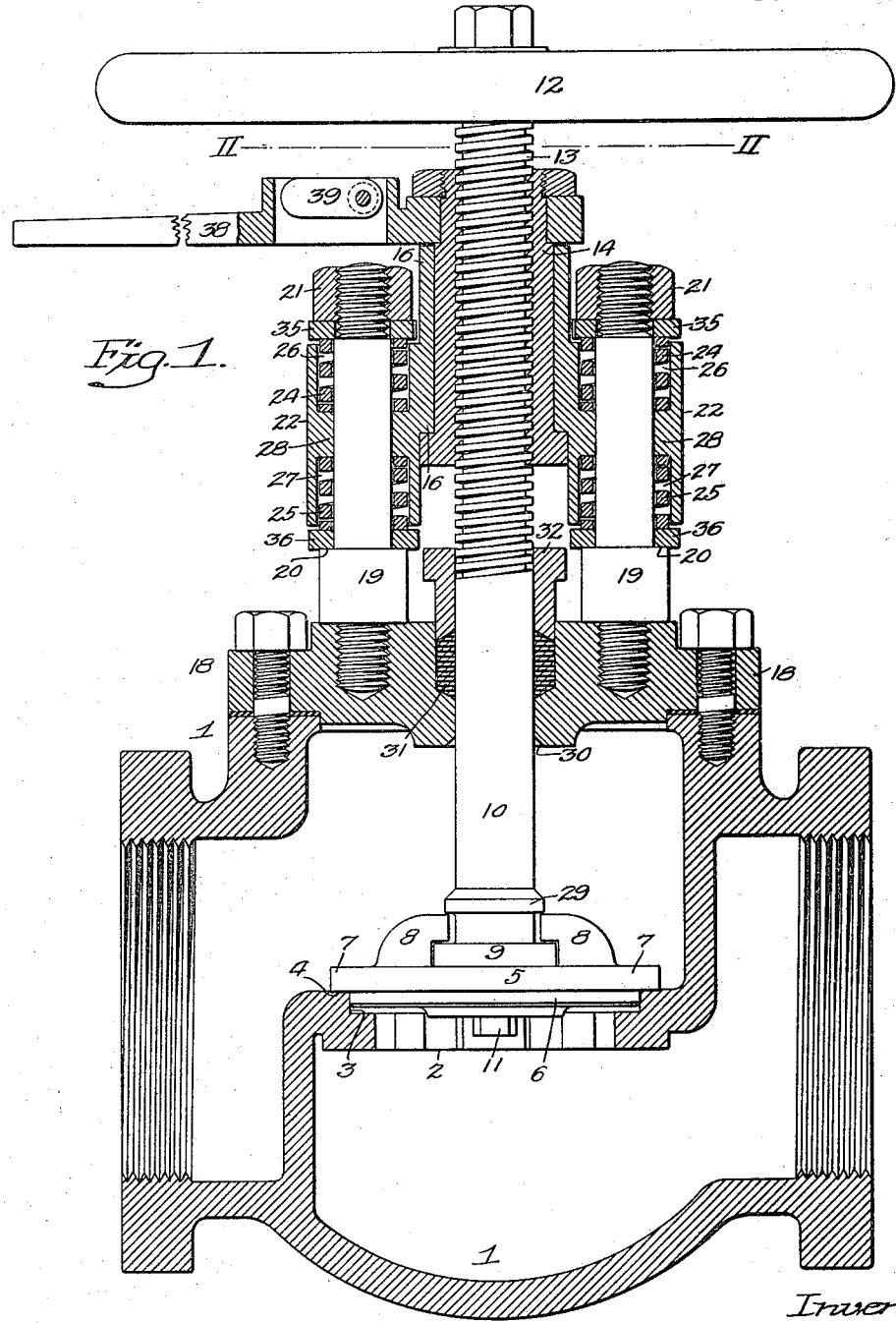
Figure 1, is a sectional elevation of my improved valve structure;

Fig. 4, is a vertical sectional view illustrating a modified arrangement of a part of the valve structure within the scope of my invention, and Fig. 5, is a sectional view on the line V—V, Fig. 2.
In the drawings, 1 represents the usual casing or body having a wall or diaphragm 2 with an opening or passage 3, having an annular seat 4 surrounding the same; a disk valve 5 being provided which may have a depending portion 6 substantially fitting the annular wall of the opening or passage 3, and an outwardly extending flange 7 for engagement with the seat 4.

The disk valve may be provided with a pair of upwardly extending lugs 8 adapted to engage a squared or T head 9 of the valve stem 10, which head is laterally slidable with respect to said valve disk when assembling the parts, and said stem may be pro-
vided with a socket (not shown) whereby it may be retained in place by a screw plug 11 passing through the lower portion or wall of the valve disk. The valve stem 10, which is provided with the usual hand wheel 12 whereby it may be turned, is threaded at 13, and adapted to the threaded portion is the usual nut 14 carried by and journaled in a yoke member or bearing 16 wich may be, and in the present instance is, a solid structure.

The body of the valve structure receives a bonnet 18 carrying a pair of stud bolts 19 tapped into the same; said bolts having shoulders 20 and carrying nuts 21 at their free ends. These bolts pass through tubular portions 22 at the sides of the yoke member 16 and carry springs 24 and 25 in sockets 26 and 27 formed in said tubular portions; each of the springs 24 being disposed above a central web 28 forming the bottom of said sockets, while the springs 25 are disposed below said web. By this arrangement the nut 14 is provided with yielding or elastic resistance when the valve stem is moved in either direction, as when seating the valve disk against the seat 4 in closing the valve, or when grinding the same; or when seating a collar 29 on the valve-stem against a seat 30 in the bonnet, when the valve stem is raised to permit renewal or adjustment of the packing 31. This packing may be held in place by a gland 32 which is secured by stud bolts 33, as shown in Fig. 2.

The bolts 19 passing through tubular portions 22 of the yoke member 16 are provided with collars or washers 35 and 36, above and below the springs 24 and 25 disposed in the sockets of said tubular portions, and when the springs are compressed by reason of movement of the valve stem in either direction reacting upon said yoke member, the amount of compression is limited so that there is no danger of compressing said springs beyond their elastic limit or of causing them to take a permanent set.

Secured to the upper part of the nut 14 is a handle or lever 38, whereby said nut may be turned in its seat in the yoke member 16 for the purpose of imparting additional pressure to the valve after it has been seated by movement of the hand-wheel; the lever 38 moving in a reverse direction to the movement of the hand wheel, thus giving an endwise thrust to the valve stem without imparting any turning movement to the valve disk 5.

In this connection it may be noted that the friction of the valve disk on its seat, in the case of larger valves, is so great that it is impossible to apply sufficient force to the hand wheel to secure a steam tight joint between said valve disk and its seat; hence the use of a lever carried by the nut in which valve stem turns for this purpose.

It is preferably desirable to limit the amount of pressure which may be applied by the lever 38, and for this purpose said lever is provided with a movable latch or pawl 39, adjustable to a plurality of positions; being pivotally mounted on a pin 40 and held frictionally in its adjusted positions by means of a coiled spring 41.

When the latch is moved to a position above the handle it will engage one of the spokes of the hand wheel 12 employed for turning the valve stem and valve disk, and after the limit of pressure effected by the movement of the lever with respect to said hand wheel has been reached, the hand wheel and lever may move together and grind the valve to its seat; there being no vertical movement of the valve stem during this rotation of the same, as long as the latch is in engagement with the hand wheel.

When the latch is turned down, it will arrest movement of the lever by engagement with a fixed portion of the valve body. When the latch 39 is in the neutral position, the lever may be employed to turn the nut without turning the valve stem: thereby adding pressure to force valve disk to its seat.

In the structure shown in Fig. 4, the nut is provided with a thread 42 of fine pitch for threaded engagement with the yoke member 16; the pitch being less and the threads extending in a reverse direction with respect to those of the stem, whereby a more powerful force may be exerted to force the valve disk to its seat than can be exerted by use of the structure shown in Fig. 1.

In the arrangement shown in Fig. 4, the grinding of the seat and valve disk is performed by bringing their surfaces into contact by movement of the hand wheel to turn the valve stem. The lever is then moved to increase the tension of the springs 24 and 25 to the desired extent, and then the latch or pawl 39 is placed in position for engagement with one of the spokes of the hand wheel. After this the lever is moved back and forth between two of the spokes of said hand wheel until the grinding is complete. This arrangement has the advantage of securing a greater movement of the valve disk on its seat before the yoke member 16 comes in contact with the collars or washers on the studs, due to the fine pitch of the thread on the exterior of said nut.

When the valve is wide open and it is desired to repack the stem or adjust the packing, a steam tight joint may be made between the valve stem and bonnet by bringing the ring 29 on the valve stem 10 against the seat 30 in the bonnet. This seat may also be ground to insure a tight joint by rotating the ring against the seat during compression of the springs 24 and 25 in the sockets of the tubular portions of the yoke member 16; thereby making possible the proper packing of the stuffing box under full pressure. In the usual forms of valves it is practically impossible to pack the stuffing boxes under pressure due to the scaling and corrosion of the surfaces corresponding to the collar 29 and its seat 30, which cannot be cleaned, or one surface rotated with respect to the other owing to peculiarities of design. My design of valve lends itself particularly to the maintenance of these surfaces in good condition.

I claim:

1. In a valve structure, the combination of a casing having a seat, a valve disk for engagement therewith, a threaded stem carrying said valve disk, a nut for said stem, a socketed yoke member surrounding said nut, springs mounted in said sockets, an abutment member at the inner ends of said springs, stud bolts carried by the valve casing and passing through said socketed member, said bolts passing through said springs, and collars carried by said bolts above and below the springs for contact with the yoke member whereby compression of said springs is limited.

2. The combination, in a valve structure, of a casing, a bonnet therefor, a valve seat in said casing, a valve disk adapted to said seat, a threaded stem for said valve passing through said bonnet, a yoke member having tubular portions at its sides, a nut in which the valve stem is adapted to turn carried by said yoke member, stud bolts carried by the bonnet and passing through the tubular portions of the yoke member, nuts carried by said stud bolts, said tubular portions having a central shoulder forming independent pockets, springs mounted in said pockets and engaging said shoulder, and means for limiting the compression of said springs.

3. In a valve structure, the combination of a casing having a seat, a valve disk for engagement therewith, a threaded stem carrying said valve disk, a nut for said valve stem; said nut having a threaded exterior, means for turning said nut, and a spring supported member surrounding said nut and in which it is adapted to turn on its threads.

4. In a valve structure, the combination of a casing having a seat, a valve disk for engagement therewith, a threaded stem carrying said valve disk, means for turning said stem, a nut for said valve stem; said nut having a threaded exterior, means for turning said nut, and a spring supported member surrounding said nut and in which it is adapted to turn on its threads, and means for coupling the turning means for the valve disk and the turning means for the nut whereby the valve may be rotated on its seat after it has been forced into engagement therewith.

PHILIP ECKENROTH.

Copies of this patent may be obtained for five cents each, by addressing the "Commissioner of Patents, Washington, D. C."